(12) United States Patent
Nakayama

(10) Patent No.: US 8,488,136 B2
(45) Date of Patent: Jul. 16, 2013

(54) PRINTING SYSTEM AND METHOD, AND RECORDING MEDIUM

(75) Inventor: Tohru Nakayama, Tokyo (JP)

(73) Assignee: Kyocera Document Solutions Inc., Osaka (JP)

( * ) Notice: Subject to any disclaimer, the term of this patent is extended or adjusted under 35 U.S.C. 154(b) by 1454 days.

(21) Appl. No.: 11/746,345

(22) Filed: May 9, 2007

(65) Prior Publication Data

US 2007/0263241 A1 Nov. 15, 2007

(30) Foreign Application Priority Data

| May 12, 2006 | (JP) | P2006-133517 |
| May 12, 2006 | (JP) | P2006-133518 |
| May 12, 2006 | (JP) | P2006-133519 |
| May 12, 2006 | (JP) | P2006-133520 |

(51) Int. Cl.
*G06F 3/12* (2006.01)

(52) U.S. Cl.
USPC .......................... 358/1.13; 358/1.15; 358/450

(58) Field of Classification Search
USPC ................ 358/1.15, 1.1, 1.9, 1.13, 3.28, 401, 358/448, 450
See application file for complete search history.

(56) References Cited

U.S. PATENT DOCUMENTS

| 7,146,498 | B1 | 12/2006 | Takechi et al. | |
| 2002/0030848 | A1 | 3/2002 | Moriyama et al. | |
| 2003/0231785 | A1* | 12/2003 | Rhoads et al. | 382/100 |
| 2004/0258277 | A1 | 12/2004 | Ueda | |
| 2005/0088701 | A1 | 4/2005 | Uchida et al. | |
| 2005/0243355 | A1* | 11/2005 | Foehr et al. | 358/1.13 |
| 2006/0075241 | A1* | 4/2006 | Deguillaume et al. | 713/176 |
| 2009/0303510 | A1 | 12/2009 | Uchida et al. | |

FOREIGN PATENT DOCUMENTS

| CN | 1632738 | 6/2005 |
| CN | 1709709 | 12/2005 |
| JP | 2000-242491 | 9/2000 |
| JP | 2001-127975 | 5/2001 |
| JP | 2001-346034 | 12/2001 |
| JP | 2002-171400 | 6/2002 |
| JP | 2003-345540 | 12/2003 |
| JP | 2005-117589 | 4/2005 |

* cited by examiner

*Primary Examiner* — Thomas D Lee
(74) *Attorney, Agent, or Firm* — K&L Gates LLP

(57) ABSTRACT

A printing system and method and recording medium are provided. In the printing system that directly prints file data described in PDL (Page-Description Language), a client generates an additional pattern, selects a print pattern, analyzes a PDL file to be processed and appends the additional pattern to the print layout to re-make a PDL file, and sends the generated PDL file to a printer that directly prints file data described in PDL in the PDL file including the additional pattern sent from the client along with the additional pattern adjusted to the print layout.

15 Claims, 19 Drawing Sheets

FIG. 4

| Selected file | |
|---|---|
| C:¥temp¥A.pdf | |

Double-side print: ○ No  ○ Long edge  ● Short edge
Resolution: ○ 300DPI  ● 600DPI  ○ 1200DPI
Job offset: ○ No  ● Yes
No. of copies: 1 copies
Decrypt keyword set: ********
Tint block print: ○ No  ● Yes
Tint-block pattern
Tint-block character: No copying
Watermark: ● No  ○ Yes
Selected printer Other settings

FIG.5

Print setting

- No. of copies (C): 1
- Layout (L): Print with enlargement/reduction for paper size ☐ copies (unit print (O))
- No. of pages/sheet (N): 1 / 1 2 4
- Paper size (P): 
- Double-side print (D): No
- Resolution (R): 600
- ☐ KIR(K)
- ☐ Eco-print (E)
- ☐ Settings are saved in file (S)

OK    Detail setting (T)    Cancel (A)

| Print setting | | |
|---|---|---|
| No. of copies (C): | 1 | ☐ copies (unit print (O)) |
| Layout (L): | Print without enlargement/reduction | ▸ |
| No. of pages/sheet (N): | 1 | ▸ |
| Paper size (P): | Printer setting | ▸ |
| Double-side print (D): | No | ▸ |
| Resolution (R): | 600 | ▸ |

☐ KIR (K)
☐ Eco-print (E)
☐ Settings are saved in file (S)

[OK]  [Detail setting (T)]  [Cancel (A)]

```
xref 0 3
0000000003  65535  f
0000000018  00000  n
0000000252  00000  n
0000000336  00000  n
... . .
```

FIG.22

```
trailar
<< /Encrypt >>
atartxref
19372
%EOF
```

FIG.23

PRINTING SYSTEM AND METHOD, AND RECORDING MEDIUM

CROSS REFERENCE TO RELATED APPLICATIONS

The present application claims priority to Japanese Patent Application JP 2006-133517, JP 2006-133518 and JP 2006-133519, filed in the Japanese Patent Office on May 12, 2006, the entire contents of which are incorporated herein by reference.

BACKGROUND

The present application relates to a printing system and method, in which file data described in Page-Description Language (PDL) is directly printed, and a recording medium.

With the recent development of electrophotographic page printers suitable for smaller, higher-speed digital printing, there has been more and more prevailing the printing processor using the description language that can deal with raster, graphic, characters, etc. as well as character information as in the conventional printers all in a similar manner and freely control the manipulation such as enlargement, rotation, deformation, etc. of graphics, characters, etc.

The description languages of this type include PDF (Portable Document Format) represented by Acrobat (trademark of Adobe Systems), GDI (Graphics Device Interface: trademark of Microsoft), etc. and PDL (Page-Description Language) represented by PostScript (trademark of Adobe Systems).

The personal computer (will be referred to as "PC" hereunder) can send a document file stored in a hard disk, for example, to a printer via a network such as LAN or the like for printing.

In this case, the document file is normally converted by a printer driver installed in PC into print data described in PDL such as PostScript (trademark of Adobe Systems) that can be interpreted by a printer and then sent to the printer.

On the other hand, as a document file to be distributed over the Internet, there have widely been prevailing PDF files that can be reproduced in the same format as that of their original documents irrespectively of the types of hardware and application. Including objects that can be arranged in the file in an order different from that of pages and reference information indicative of positions of the objects in the file, the PDF file defines a page formed from a predetermined object.

Some of such PDF files carry, for example, several hundred pages of data. If a PDF file having data of such a large size is converted by PC into print data, the conversion itself will take much time, complicate processing of such print data, and result in such an increased size of the print data that will take increased time for transfer. Namely, PC will be more heavily loaded. To reduce such an increased load to PC, there has been proposed a printer capable of directly printing a PDF file sent from PC to a printer without being converted into printed data (will be referred to as "PDF direct print" hereunder).

In a PDF file, however, objects as to data to be printed can be arranged irrespectively of the order of pages and reference information indicative of the positions of the objects in the file is laid in the end portion of the file, so that the printer cannot start any printing of the data before having received the whole PDF file. Therefore, the printer cannot receive the whole PDF file and thus cannot print the data since the capacity (usable capacity or free space) of the memory installed therein is insufficient in some cases.

In connection with this problem, there is known an apparatus adapted to change the content of a PDF file for reconstruction so that received data can be displayed on a display in the order of reception even before the whole PDF file is received.

Also, there is a print layout application in which various original documents prepared using an application program are arranged into one document for easier management of the documents themselves and output management.

In the print layout application, after original documents to be printed are taken in as a text, the text is normally fixed so that texts of the original documents cannot be compiled. The print layout application could be used to make only compilation concerning the document format, such as setting of a layout, appending of finishing information, appending of document format or the like.

In case an electronic document prepared based on PDF is printed, a dedicated utility is used to actually send a PDF file to a printer and print the PDF file by the printer.

When the user instructs the utility for an option depending upon a drawing pattern such as "tint block", "watermark" or the like at this time of printing, the utility will normally select one of the following two modes:

Mode 1:

No direct change is made of a PDF document and information for turning on a function to print "tint-block", "watermark" or the like of the printer to data to be printed is appended to a part of job information other than PDF file.

In Mode 1, the printer cannot print any picture other than can be printed or it is prohibited in other ways. Also, in case the printer itself is not adapted to address the functions "tint block" and "watermark", it cannot perform such functions.

Mode 2:

The utility analyzes a PDF document, changes the PFD document taking a user-desired pattern, character, "tint block" or "watermark" as a part of the PDF document and sends data to the printer.

In mode 2, various options can be added to the utility. Therefore, this mode is considered as a system whose future extension is possible.

However, even when functions are added to the utility for changeability of the PDF file, the utility is normally distributed free of charge.

Also, since sending a utility output to a PDF-compatible direct printer manufactured by any maker other than that developed the utility will lead to the same result, a system will possibly be built up from a combination of a utility developed by a printer maker and the printer manufactured by the other maker. It should be noted here that a printer maker having developed the utility will be referred to as "original maker" hereunder while a printer maker other than the original maker will be referred to as "other maker".

Also, in case a PDF file or format is changed for appending a tint block or watermark, the result of printing will be such that change of the layout, for example, will result in a tint block or watermark different in size from the appended one. The "layout change" means "N-UP" (in which one printed sheet includes a plurality of pages such as 2UP or 4UP), catalog print (page sorting of such a type that in case of a PDF file for 8 pages, pages 1 and 8 printed on one sheet, pages 2 and 3 printed on one sheet, pages 4 and 5 printed on one sheet and pages 6 and 7 printed on one sheet are folded and bound to form a one book) or booklet print (page sorting of such a type that in case of a PDF file for 8 pages, pages 1 and 8, pages 7 and 2, pages 3 and 6 and pages 5 and 4 are printed on one sheet, respectively). In this case, if one tint block is appended to each page, the size of finished printed page will be reduced in size with the result that the tint block will not possibly be readable even if significant.

Also, in case a layout is changed and tint block and watermark are appended, the tint block will be reduced in size and each will have the watermark, which will not be as intended by the user.

Further, the utility is not developed uniquely to each printer model but it is made in common to all models. In case one engine is a little different in performance from another, the tint block or watermark data will appear different from one to another depending upon the engine performance.

Even if an adjusting mechanism is provided in the utility, when the utility is used with another printer, the engine performance will be different from the present engine to the previous one and the utility have to be readjusted for use with the present printer.

SUMMARY

It is therefore desirable to overcome the above-mentioned drawbacks of the related art by protecting the function of a utility that allows changing of a PDF file in a printing system that directly prints file data described in PDL (Page-Description Language).

Also it is desirable to allow a printing system that directly prints a PDF file as it is to print the PDF file correctly by recombining PDF file to append a tint block to original PDF data.

Also, it is desirable to process a PDF file in a printing system that sends file data described in PDL (Page-Description Language) from a client to printer and directly prints the file data described in PDL so that a tint block can be printed correctly.

Further, it is desirable to determine, when in a printing system that directly prints file data described in PDL (Page-Description Language), the function of a utility to change a PDF file is used to append additional patterns such as a "tint block", "watermark", etc., at a printer driver, the type of a printer to which a PDF file is going to be sent and process the PDF file to be compatible with the printer of that determined type.

According to an embodiment, there is provided a printing system, including:

a client; and a printer connected to the client, and the client further including:

a PDL file re-making means which analyzes a PDL file to be processed and processes it to re-make a PDL file;

an encrypting means which encrypts the PDL file re-made by the PDL file re-making means with an arbitrary encrypt key; and a PDL file sending means which decrypts the PDL file encrypted by the encrypting means and appends, to the encrypted PDL file, a decrypt key for decrypting the PDL file encrypted by the encrypting means under a predetermine rule established the client and printer that prints file data described in PDL, and sends the PDL file to the printer, and the printer, further including:

a decrypting means which decrypts the encrypted PDL file sent from the client with the decrypt key; and a printing means which directly prints the file data described in PDL in the PDL file decrypted by the decrypting means.

That is, in the above printing system according to the embodiment of an embodiment, the PDL sending means sends the PDL file not processed by the PDL file re-making means to the printer without encrypting it, and the printing means directly prints not-encrypted PDL file sent from the client.

Also, in the printing system according to an embodiment, the PDL file sending means appends the decrypt key selected through checking against a public key and sends it to the printer.

Further, the printing system according to an embodiment further including:

a decrypting means which determines whether the PDL file to be processed has been encrypted or not and decrypts the PDL file, if encrypted, the PDL file re-making means analyzes the to-be-processed PDL file decrypted by the decrypting means and processes it to re-make a PDL file, and the encrypting means encrypts the PDL file re-made by the PDL re-making means with an encrypt key different from the initial encrypt key, wherein:

the client includes the decrypting means.

According to an embodiment, there is also provided a printing method in which a client analyzes a PDL file to be processed and processes it to re-make a PDL file, encrypts the re-made PDL file with an arbitrary encrypt key, decrypts the decrypted PDL file and appends, to the encrypted PDL file, a decrypt key for decrypting the encrypted PDL file under a predetermine rule established the client and printer, and sends the PDL file to a printer connected to the client, and the printer decrypts the encrypted PDL file sent from the client with the decrypt key and directly prints file data described in PDL in the decrypted PDL file.

According to an embodiment, there is also provided a recording medium having recorded therein a printing program designed for a client to analyze a PDL file to be processed and process it to re-make a PDL file, encrypt the re-made PDL file with an arbitrary encrypt key, decrypt the decrypted PDL file and append, to the encrypted PDL file, a decrypt key for decrypting the encrypted PDL file under a predetermine rule established the client and printer, and send the PDL file to a printer connected to the client, and for the printer to decrypt the encrypted PDL file sent from the client with the decrypt key and directly print file data described in PDL in the decrypted PDL file.

That is, according to an embodiment, when a PDF direct-print utility has changed the content of a PDF file, the PDF file is encrypted for transfer to the printer. The encrypt and decrypt keys for encryption and decryption, respectively, designed for understanding by only the printer and PDF direct-print utility. How the encryption is transferred and decryption key is generated will be explained herein. Whenever the PDF file additionally processed by the utility is sent to the printer, it is encrypted before it is so sent, while the decrypt key is transferred by a method unique to the original maker. Thus, any printer manufactured by the other maker cannot print the PDF file.

Also, even if any action to monitor the data along a transfer path has been made to capture the data, the stolen data cannot be printed by the printer made by the other maker. Even if data can be printed by a printer manufactured by the original maker to provide a printed matter, the content of additional processing by the utility such as "watermark" or the like cannot be known since the PDF file has been encrypted.

If the PDF file to be printed has already been encrypted, a decrypt key entered by the user to the utility is required for re-making the PDF file. According to an embodiment, the utility has to re-encrypt the PDF file. The decrypt key used for the re-encryption should be quite different from that having entered by the user, which is effective to prevent the other maker from analyzing the tool and the content of the utility-based PDF file print.

According to an embodiment, there is also provided a printing system, including:

a client; and a printer connected to the client, and the client further including:

an additional pattern generating means which generates an additional pattern;

a print layout selecting means which selects a print layout;

a PDL file re-making means which analyzes a PDL file to be processed and appends an additional pattern generated by the additional pattern generating means to a pint layout selected by the print layout selecting means to re-make a PDL file; and a PDL file sending means which sends the PDL file re-made by the PDL file re-crating means to the printer, and the printer, further including:

a printing means which directly prints file data described in PDL in the PDL file including the additional pattern sent from the client along with the additional pattern in the print layout selected by the print layout selecting means.

According to an embodiment, there is also provided a printing method in which a client generates an additional pattern; selects a print layout, analyzes a PDL file to be processed and appends the additional pattern to the selected pint layout to re-make a PDL file, and sends the re-made PDL file to a printer connected to the client, and the printer directly prints file data described in PDL in the PDL file including the additional pattern sent from the client along with the additional pattern adjusted to the print layout.

According to an embodiment, there is also provided a recording medium having recorded therein a printing program designed for a client to generate an additional pattern, select a print layout, analyze a PDL file to be processed and append the additional pattern to the selected pint layout to re-make a PDL file, and send the re-made PDL file to a printer connected to the client, and for the printer to directly print file data described in PDL in the PDL file including the additional pattern sent from the client along with the additional pattern adjusted to the print layout.

Since PDF is inherently a size-less format because of its own nature, the PDF direct-print function allows to print an image in an enlarged or reduced scale without being influenced by the print-medium size and layout. However, in case the PDF direct-print function is used to reconstruct an image with a tint block or watermark being appended to the latter, the tint block or watermark is used only in printing, so that an image of which the final form is put in consideration can be printed being added to a PDF file. According to an embodiment, the size of an output tint block can be fixed independently of any layout selected by the user and thus the size of a tint block will be valid as it is.

On this account, an embodiment fixes a print layout, when the tint block function is selected, by prohibiting various layouts from being changed so that printing will be made only in a fixed size of PDF. Use of this method allows the user to have a result of tint-block print in a regular size. Also, different from the tint-block function, the watermark function permits to change only the size of characters and images and thus it is not to be prohibited. It is prohibited only when the tint block-function is selected to change the print layout.

According to an embodiment, there is also provided a printing system, including:

a client; and a printer connected to the client, and the client further including:

an additional pattern generating means which generates an additional pattern such as watermark, tint block and the like;

a PDL file re-making means which analyzes a PDL file to be processed and appends an additional pattern generated by the additional pattern generating means to the PDL file to re-make a PDL file;

a print setting means which changes the output size of the PDL file with an output size option to be printed by the printing means in the printer; and a PDL file sending means which sends the PDL file re-made by the PDL file re-crating means to the printer, and the printer, further including:

a printing means which directly prints file data described in PDL in the PDL file including the additional pattern sent from the client along with the additional pattern, the client prohibiting, when the additional pattern which the additional pattern generating means has generated is a tint block, the output size option.

According to an embodiment, there is also provided a printing method in which a client generates an additional pattern such as watermark, tint block and the like, analyzes a PDL file to be processed, prohibits, when the additional pattern is a tint block, an output size option with which the output size of the PDL file to be printed in the printer, and appends the generated additional pattern to the PDL file to re-make a PDL file, and sends the re-made PDL file to the printer connected to the client, and the printer directly prints file data described in PDL in the PDL file including the additional pattern sent from the client along with the additional pattern.

According to an embodiment, there is also provided a recording medium having recorded therein a printing program designed for a client to generate an additional pattern such as watermark, tint block and the like, analyze a PDL file to be processed, prohibit, when the additional pattern is a tint block, an output size option with which the output size of the PDL file to be printed in the printer, and append the generated additional pattern to the PDL file to re-make a PDL file, and send the re-made PDL file to the printer, and for the printer to directly print file data described in PDL in the PDL file including the additional pattern sent from the client along with the additional pattern.

Since PDF is inherently a size-less format because of its own nature, the PDF direct-print function allows to print an image in an enlarged or reduced scale without being influenced by the print-medium size and layout. However, by setting prohibition for fixing a layout for a tint block appended at the utility and significant to the size of an image, a size of an output tint block can be fixed and a final output of the size set at the utility. Thus, the tint block will be valid as it is.

According to an embodiment, there is also provided a printing system, including:

a client; and a printer connected to the client, and the client further including:

an additional pattern generating means which determines the type of a printer connected to the client to acquire additional-pattern print density information corresponding to the printer type and generating an additional pattern on the basis of the acquired print density information;

a PDL file re-making means which analyzes a PDL file to be processed and appending an additional pattern generated by the additional pattern generating means to the PDL file to re-make a PDL file; and a PDL file sending means which sends the PDL file re-made by the PDL file re-crating means to the printer, and the printer, further including:

a printing means which directly prints file data described in PDL in the PDL file including the additional pattern sent from the client along with the additional pattern.

According to an embodiment, there is also provided a printing method in which a client determines the type of a printer connected to the client to acquire additional-pattern print density information corresponding to the printer type and generates an additional pattern on the basis of the acquired print density information, analyzes a PDL file to be processed and appends the generated additional pattern the PDL file to re-make a PDL file, and sends the re-made PDL file to the printer connected to the client, and the printer directly prints file data described in PDL in the PDL file including the additional pattern sent from the client along with the additional pattern.

According to an embodiment, there is also provided a recording medium having recorded therein a printing program designed for a client to determine the type of a printer connected to the client to acquire additional-pattern print density information corresponding to the printer type and generate an additional pattern on the basis of the acquired print density information, analyze a PDL file to be processed and append the generated additional pattern the PDL file to re-make a PDL file, and send the re-made PDL file to the printer, and for the printer directly print file data described in PDL in the PDL file including the additional pattern sent from the client along with the additional pattern.

According to an embodiment, there can be provided a function to allow only the original maker, not the other maker, to print data even with a utility by which the standard format called "PDF" is additionally processed. Since the PDF direct-print function does not depend upon the performance of each printer because of the inherent nature of PDF, the result of printing varies from one engine from another, the engines being different in performance from each other. According to an embodiment, however, additional pattern such as "tint block", "watermark" or the like in which consideration is given to information on the engine performance can appropriately be printed, which assures a more uniform result of printing.

The foregoing and other features, aspects and advantages of an embodiment will be come apparent from the following detailed description of embodiments of an embodiment when taken in conjunction with the accompanying drawings.

Additional features and advantages are described herein, and will be apparent from, the following Detailed Description and the figures.

BRIEF DESCRIPTION OF THE FIGURES

FIG. 4 illustrates a PDF direct-print utility screen;

FIG. 5 illustrates a print setting screen of the PDF direct-print utility;

FIG. 6 shows a function to select a print layout on the print setting screen;

FIG. 7 illustrates prohibited selection of a print layout on the print setting screen;

FIGS. 10A and 10B schematically illustrate results of tint-block printing, more specifically, tint-block print-out and results of copying tried of the tint block;

FIG. 22 shows the structure of the interconversion table in the PDF file;

FIG. 23 shows the structure of the trailer part of the PDF file; and

DETAILED DESCRIPTION

Figure 1:
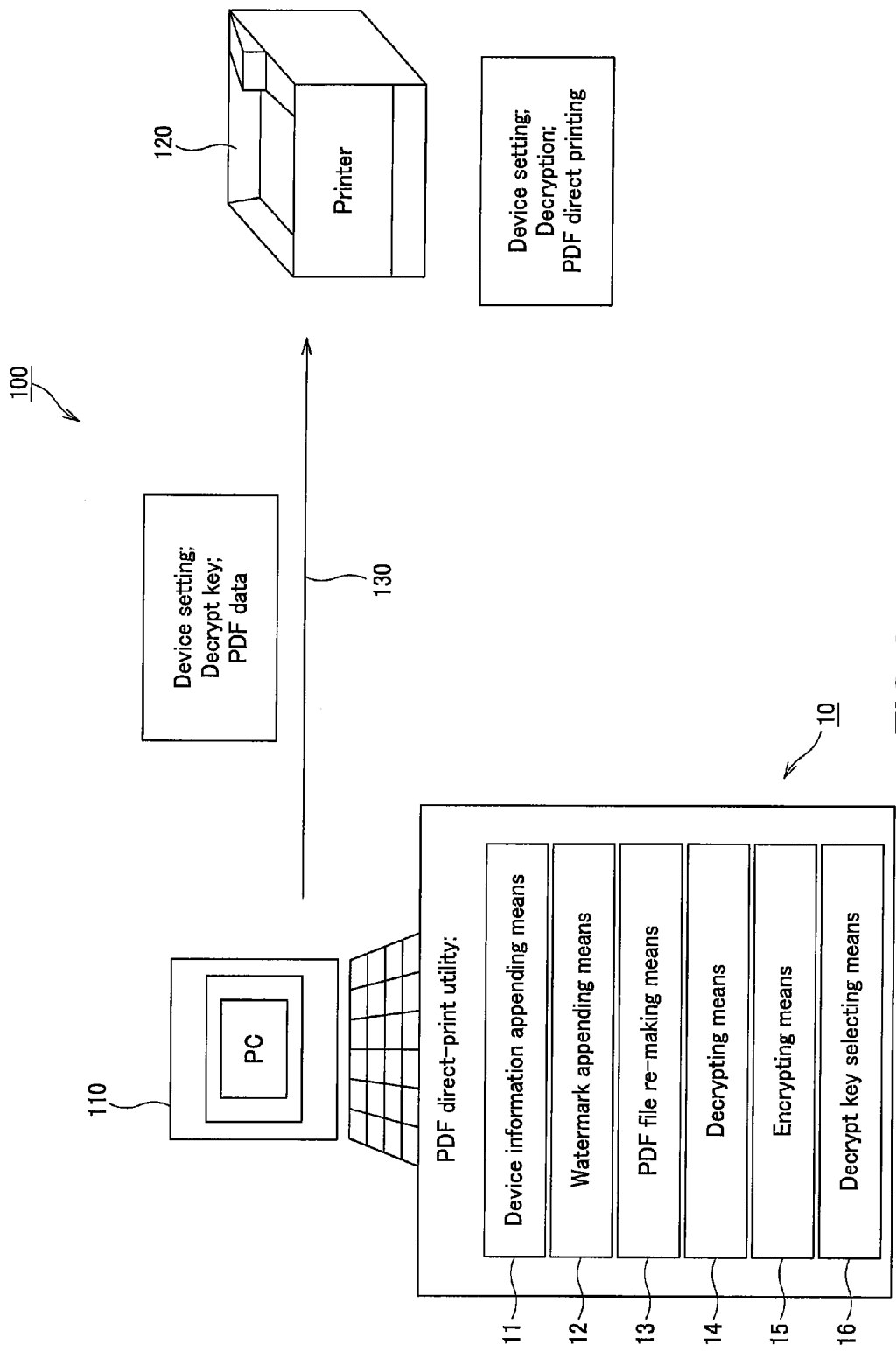
FIG. 1 is a schematic block diagram of a printing system according to an embodiment and including an image forming apparatus and client.

As shown in FIG. 1 for example, a printing system 100 according to an embodiment includes a client 110 instructed by the user to make printing and an image forming apparatus (printer) 120, the latter being connected to each other over a network 130 such as LAN to be able to communicate with each other. It should be noted that the printer 120 may be connected directly to the client 110 via a USB interface, parallel interface or the like, not over the network 130.

Figure 2:
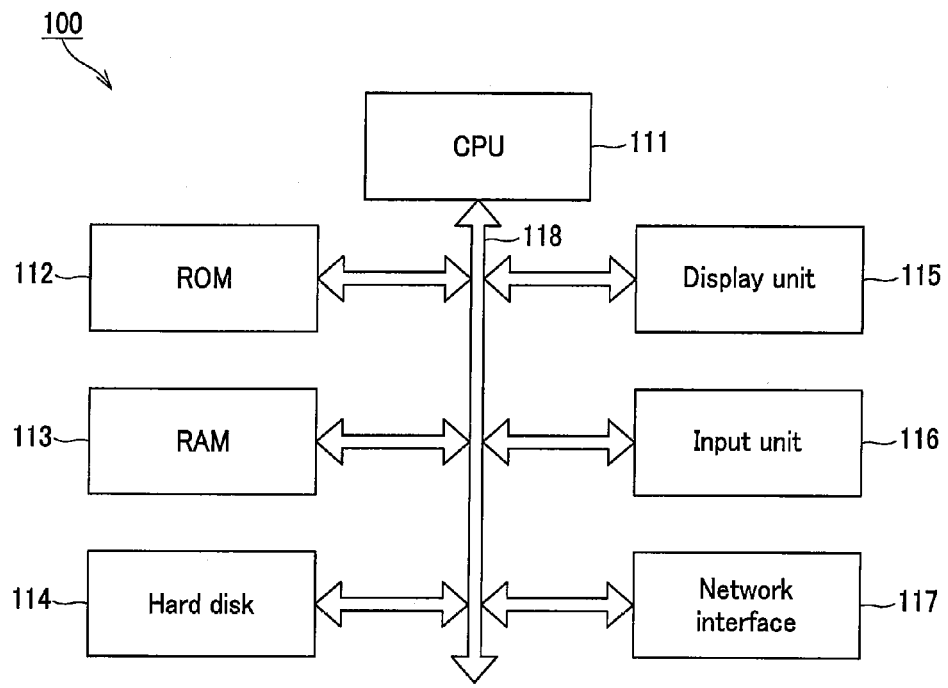
FIG. 2 is also a schematic block diagram of the hardware of the client.

The client 110 is formed from a so-called personal computer, for example, having connected thereto via a bus 118 CPU 111 to control the entire system and a variety of operations, ROM 112 to store programs and data, RAM 113 that works as a work area to provisionally store programs and data, hard disk 114 as an external storage unit to store various programs and data, display unit 115 such as a liquid crystal display to display a variety of information, input unit 116 formed from a keyboard, mouse, etc. to make entry of various instructions, network interface 117 such as a LAN card or the like to connect to the network 130, etc. as shown in FIG. 2.

Figure 3:
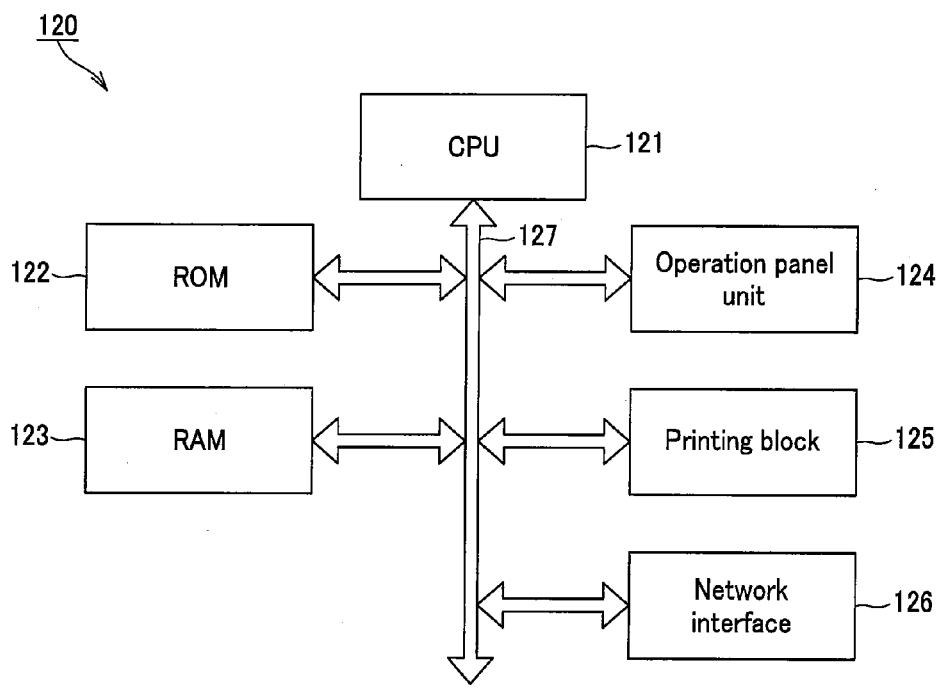
FIG. 3 is a schematic block diagram of the hardware of the image forming apparatus.

Also, the printer 120 has connected thereto via a bus 127 CPU 121 to control the entire system and a variety of operations, ROM 122 to store programs and data, RAM 123 that works as a work area to provisionally store programs and data, operation panel unit 124 used to display a variety of information and make entry of instruction, printing block 125 that prints various data on a recording material such as a printing paper making the use of a well-known imaging process such as electrophotography process or the like, network interface 126 such as a LAN card or the like to connect to the network 130, etc. as shown in FIG. 3.

In the printing system 100, the client 110 has installed therein a PDF direct-print utility 10 having the following functions.

More specifically, the client 110 having the direct-print utility 10 installed therein includes a device information appending means 11 that appends, on a PDF direct-print utility screen 20 shown in FIG. 4, device information such as user-designated double-side printing, resolution, finish option and the like to a user-designated PDF file.

Also, the client 110 having the direct-print utility 10 installed therein includes a PDF file re-making means 13 for analyzing a PDF file and appending a tint block or watermark to re-make a PDF file when a tint block/watermark appending means 12 is designated.

Also, the client 110 having the direct-print utility 10 installed therein includes a decrypting means 14 to decrypt an encrypted PDF file with a user-designated decrypt key and an encrypting means 15 for making encryption with an arbitrary encrypt key.

Also, the client 110 having the direct-print utility 10 installed therein can acquire the type of a printer that should make printing and other information from a printer driver.

Also, the client 110 having the direct-print utility 10 installed therein includes a decrypt key selecting means 16 for selecting a decrypt key through checking against a public key with the printer 120.

Figure 5:
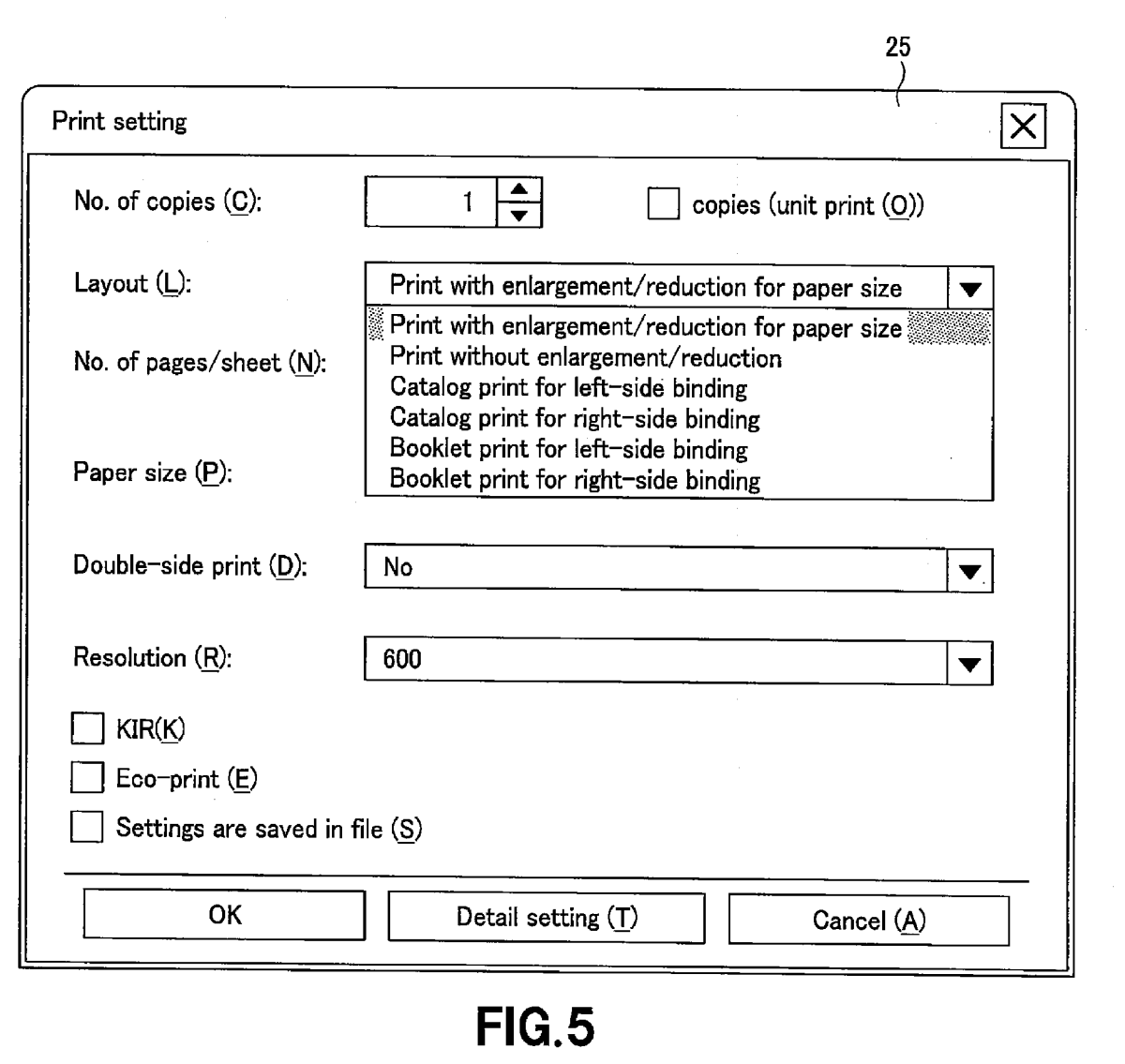

Also, the client 110 having the direct-print utility 10 installed therein includes a print layout selecting means 17 for selecting a print layout on a print setting screen 25 shown in FIG. 5.

On the print setting screen 25 shown in FIG. 5, there can be selected a plurality of layouts "print without enlargement/reduction", "print with enlargement/reduction for paper size", "catalog print for right-side binding", "catalog print for left-side binding", "booklet print for right-side binding" and "booklet print for left-side binding". Also, the PDF file has an "N-Up" item in which a page number on one sheet can be selected as "1", "2" and "4" as shown in FIG. 6.

In this printing system 100, the PDF direct-print utility 10 will prohibit the user from selecting the layout "N-UP (number of pages per sheet)" when the "tint-block print" is selected on the print setting screen 25 as shown in FIG. 7. When the "tint-block print" is selected, the utility 10 will prohibit the user from selecting both the layout "print without enlargement/reduction" and "No. of pages/sheet: 1" by graying out these options.

Figure 8:
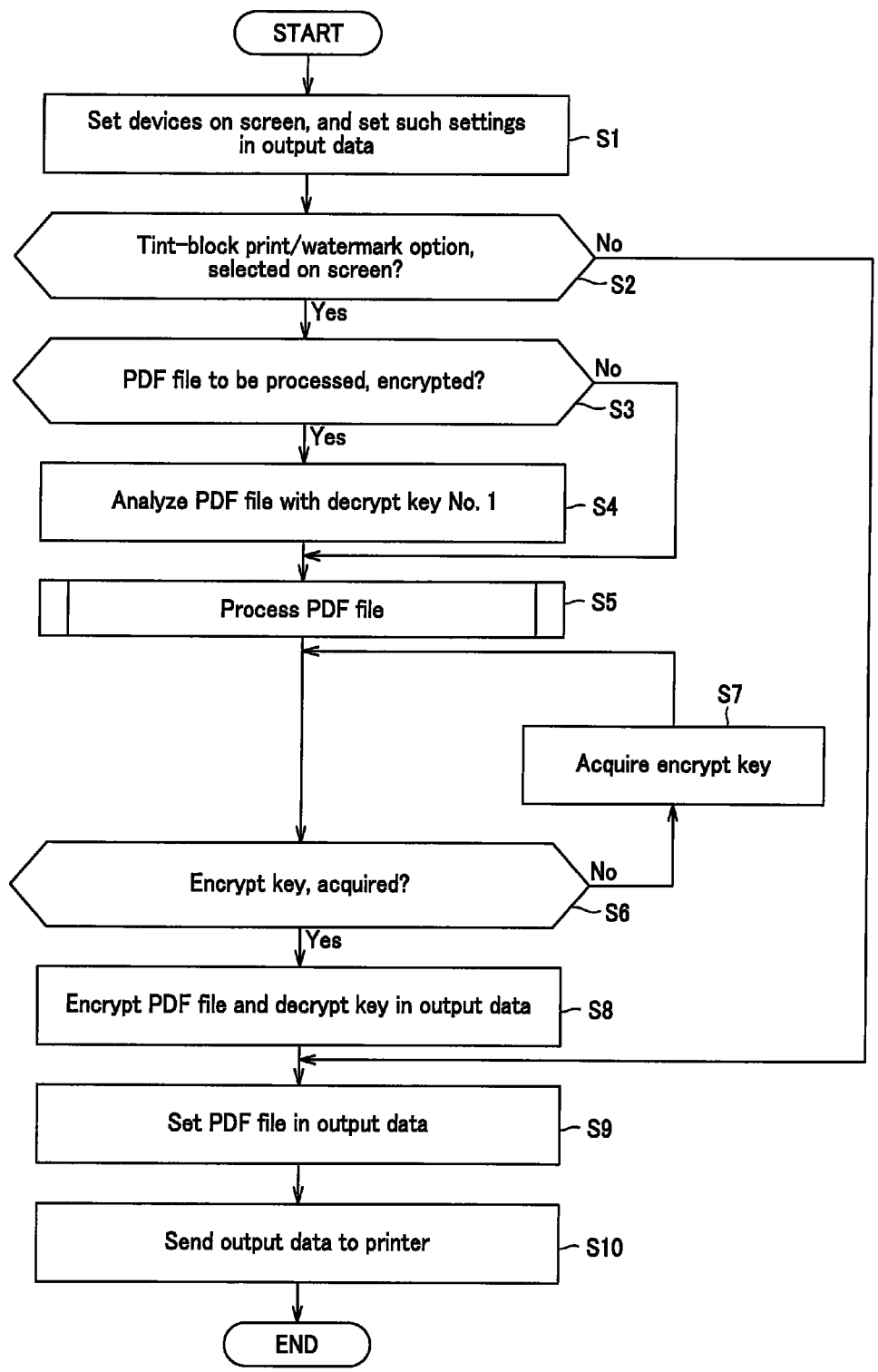
FIG. 8 shows a flow of operations made in printing by the PDF direct-print utility.

The client 110 having the PDF direct-print utility 10 installed therein will go through steps S1 to S8 in the flow diagram shown in FIG. 8 as will be described below:

In step S1, CPU 111 in the client 110 in which the PDF direct-print utility 10 is installed will control the device information appending means 11 to convert information for controlling various devices into device control code for the printer (image forming apparatus) 120 and save the code as output data.

In step S2, CPU 111 in the client 110 will check the condition of the tint-block print/watermark option screen to determine which has been selected by the tint-block print/watermark appending means 12, the tint-block print option or watermark option.

In case the result of the determined made in step S2 is negative (NO), that is, when neither the tint-block print option nor watermark option has been selected by the tint-block print/watermark appending means 12, CPU 111 in the client 110 will go to step S9 where it will set a PDF file in the output data.

Also, in case the result of the determined made in step S2 is affirmative (YES), that is, when either the "tint-block print" option or "watermark" option has been selected by the tint-block print/watermark appending means 12, namely, in case it has been determined that the PDF file itself has to be re-made, CPU 111 in the client 110 will go to step S3 where it will determine whether a user-designated PDF file to be processed has been encrypted or not.

In case the result of the determination made in step S3 is negative (NO), namely, when the PDF file has not been encrypted, CPU 111 in the client 110 will go to step S5 where it will control the PDF file re-making means 13 to append the tint block or watermark to the user-designated PDF file to re-make the PFD file itself and thus provide a new PDF file.

Also, in case the result of the determination made in step S3 is affirmative (YES), namely, when the PDF file has been encrypted, CPU 111 in the client 110 will go to step S4 where the decrypting means 14 will decrypt the PDF file to be processed with the use of a decrypt key No. 1 entered on the screen and then CPU 111 will go to step S5 where it will control the PDF file re-making means 13 to append the tint block or watermark to the user-designated PDF file to re-make the PFD file itself and thus provide a new PDF file.

In processing the PDF file in step S5 by the PDF file re-making means 13, in case the "tint-block print" option has been selected on the print setting screen 25, CPU 111 in the client 110 will prohibit the user from selecting the layout "N-UP (No. of pages/sheet)". If the "tint-block print" option has been selected, CPU 111 will prohibit the user from selecting both the layout "print without enlargement/reduction" and "No. of pages/sheet: 1" by graying out these options.

In step S6, CPU 111 in the client 110 will determine whether an encrypt key has been acquired or not.

In case the result of the determination made in step S6 is affirmative (YES), namely, when a public encrypt key in the utility is already available to the printer and its PDF file, CPU 111 in the client 110 will go to step S8 where it will control the encrypting means 15 to encrypt the PDF file with the key under the PDF rule to set a decrypt key for the encrypted DPF file in the output data under an original rule established between the printer 120 and utility.

In case the result of the determination made in step S6 is negative (NO), namely, when no encrypt key has been acquired, CPU 111 in the client 110 will go to step S7 where it will communicate with the printer 120 to acquire the encrypt key. If this is not possible, CPU 111 will go step S8 where it will control the encrypting means 15 to encrypt the PDF file with the key under the PDF rule to set a decrypt key for the encrypted PFD in the output data under the original rule established between the printer 120 and utility. At this time, the decrypt key No. 1 having been used in generating a PDF file is not used but a new decrypt key No. 2 is used.

In step S9, CPU 111 in the client 110 will set the PDF file in the output data.

Then in step S10, CPU 111 in the client 110 will send the output data to the printer 120.

Figure 9:
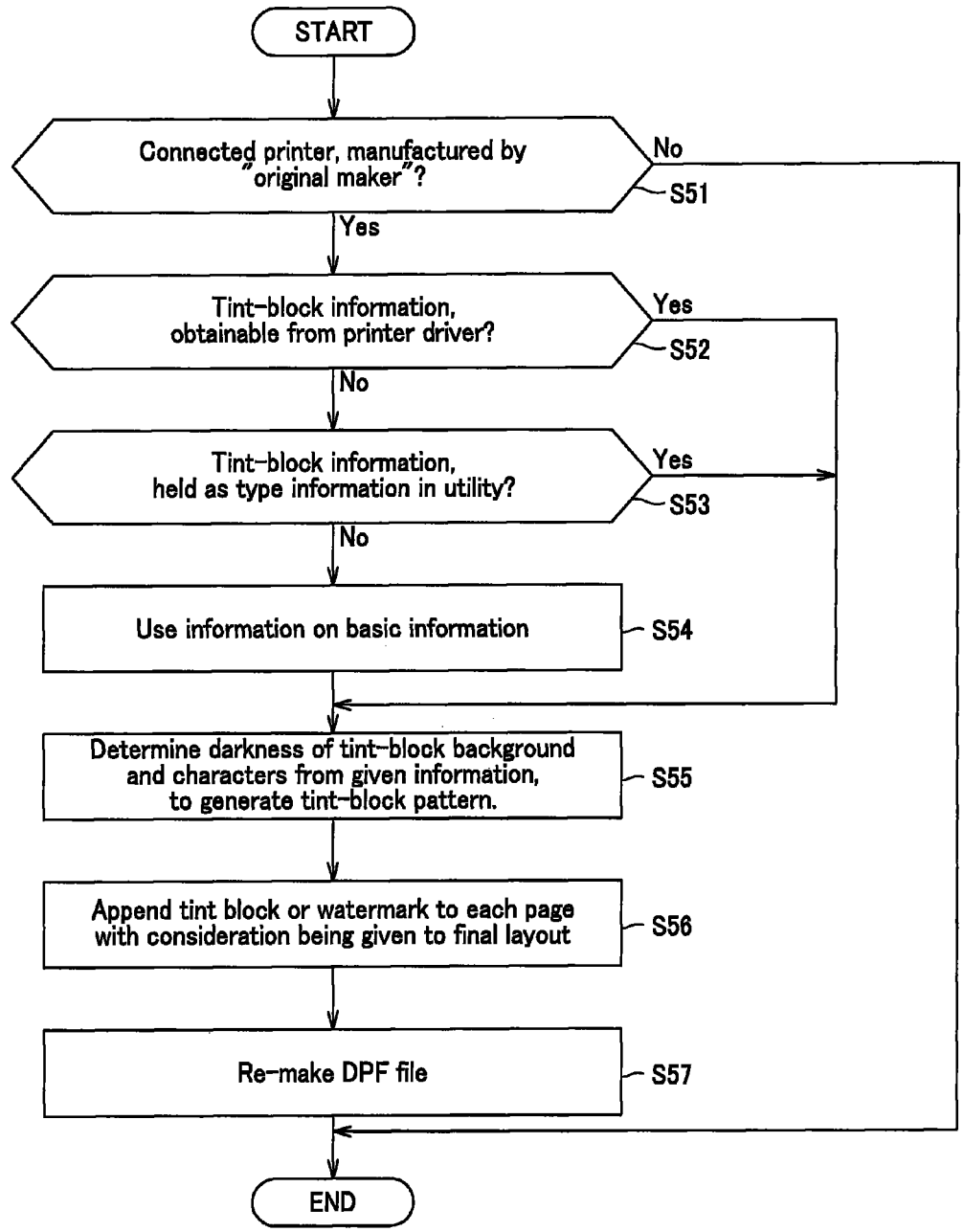
FIG. 9 shows a flow of operations made in processing of a PDF file when printing a tint block by the PDF direct-print utility.

In step S5, CPU 111 in the client 110 of the printing system 100, having the PDF direct-print utility 10 installed therein, will control the PDF file re-making means 13 to process the PDF file through the steps in the flow diagram shown in FIG. 9, for example.

FIG. 9 shows a flow of operations made by the DPF direct-print utility 10 in making "tint-block print".

Figures 10A, 10B:
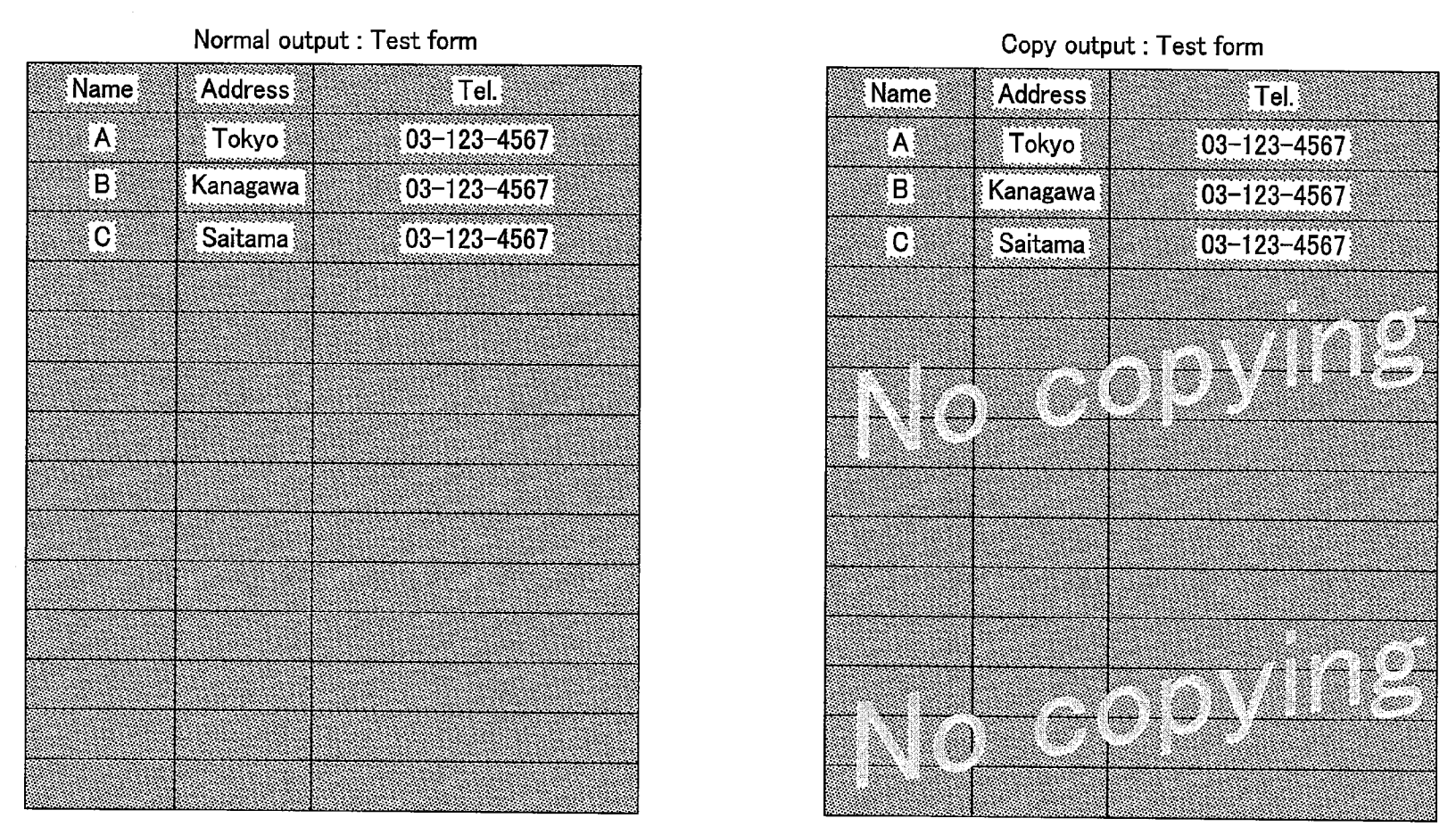

It should be noted here that the "tint block" refers herein to a method in which a picture or characters depicted in the same darkness as that of the background as shown in FIG. 10A will appear more noticeable than the background as shown in FIG. 10B.

When in the PDF file processing (in step S5), CPU 111 in the client 110 will read, first in step S51, printer-maker information from internal information in the printer driver connected thereto and determine whether the printer has been manufactured by the "original maker" having developed the utility or not.

In case the result of the determined made in step S51 is negative (NO), that is, in case the printer has been manufactured by other than the "original maker", CPU 111 in the client 110 will control the PDF file re-making means 13 to straightly exit the procedure without making "tint block" and "watermark" operations. That is, CPU 111 will not process the PDF file for a printer manufactured by the "other maker".

In case the result of the determined made in step S51 is affirmative (YES), that is, in case the printer has been manufactured by the "original maker", CPU 111 in the client 110 will go to step S52 where it will determine, based on the information held in the driver connected thereto, whether it is possible to acquire information on the darkness of the tint-block background and characters.

In case the result of the determination made in step S52 is affirmative (YES), namely, in case it is possible to acquire tint-block information from the printer driver, CPU 111 in the client 110 will got to step S55 where it will determine a darkness of the tint-block background and characters on the basis of the information held in the connected driver to generate a tint-block pattern.

In case the result of the determination made in step S52 is negative (NO), namely, in case it is not possible to acquire tint-block information from the printer driver, CPU 111 in the client 110 will got to step S53 where it will determine whether the utility holds tint-block and character darkness information as printer-type information.

In case the result of the determined made in step S53 is affirmative (YES), that is, in case the utility holds tint-block information, CPU 111 in the client 110 will go to step S55 where it will control the PDF file re-making means 13 to determine a darkness of the tint-block background and characters on the basis of the tint-block information held in the utility to generate a tint-block pattern.

In case the result of the determined made in step S53 is negative (NO), that is, in case the utility holds no tint-block information, CPU 111 in the client 110 will read information on basic devices in step S54 and go to step S55 where it will control the PDF file re-making means 13 to determine a darkness of the tint-block background and characters on the basis of information on the above basic devices information to generate a tint-block pattern.

Next in step S56, CPU 111 in the client 110 will control the PDF file re-making means 13 to append a tint block or watermark to each page with consideration being given to a final layout.

Next in step S57, CPU 111 in the client 110 will append the tint-block pattern having been generated in step S55 as a tint-block pint option to a user-designated PDF file to be processed and control the PDF file re-making means 13 to re-make the PDF file itself to generate a new PDF file.

That is to say, in the printing system 100, CPU 111 in the client 110, having the direct-print utility 10 installed therein, checks a printer (image forming apparatus) 120 connected thereto, acquires tint-block information from the driver information on the connected printer and automatically selects an appropriate darkness of "tint block" or "watermark" print. A print image of the "tint mark" or "watermark" having the appropriate darkness selected in the above step is set in the to-be-processed PDF file selected by the user. More specifically, the direct-print utility 10 analyzes, develops and converts the to-be-printed PDF file itself selected by the user into an image having "tint mark" or "watermark" appended thereto to re-make a new PDF file.

In case the direct-print utility 10 has controlled the PDF file re-making means 13 to re-make a new PDF file, the encrypting means 15 encrypts the PDF file. The decrypt key used for the encrypted PDF file has been selected in some way by the decrypt key selecting means 16. Namely, the user has not to enter any such decrypt key. The decrypt key is unknown to the user. With this technique, the user will be able to acquire a best printed result of "tint block" or "watermark".

Figure 11:
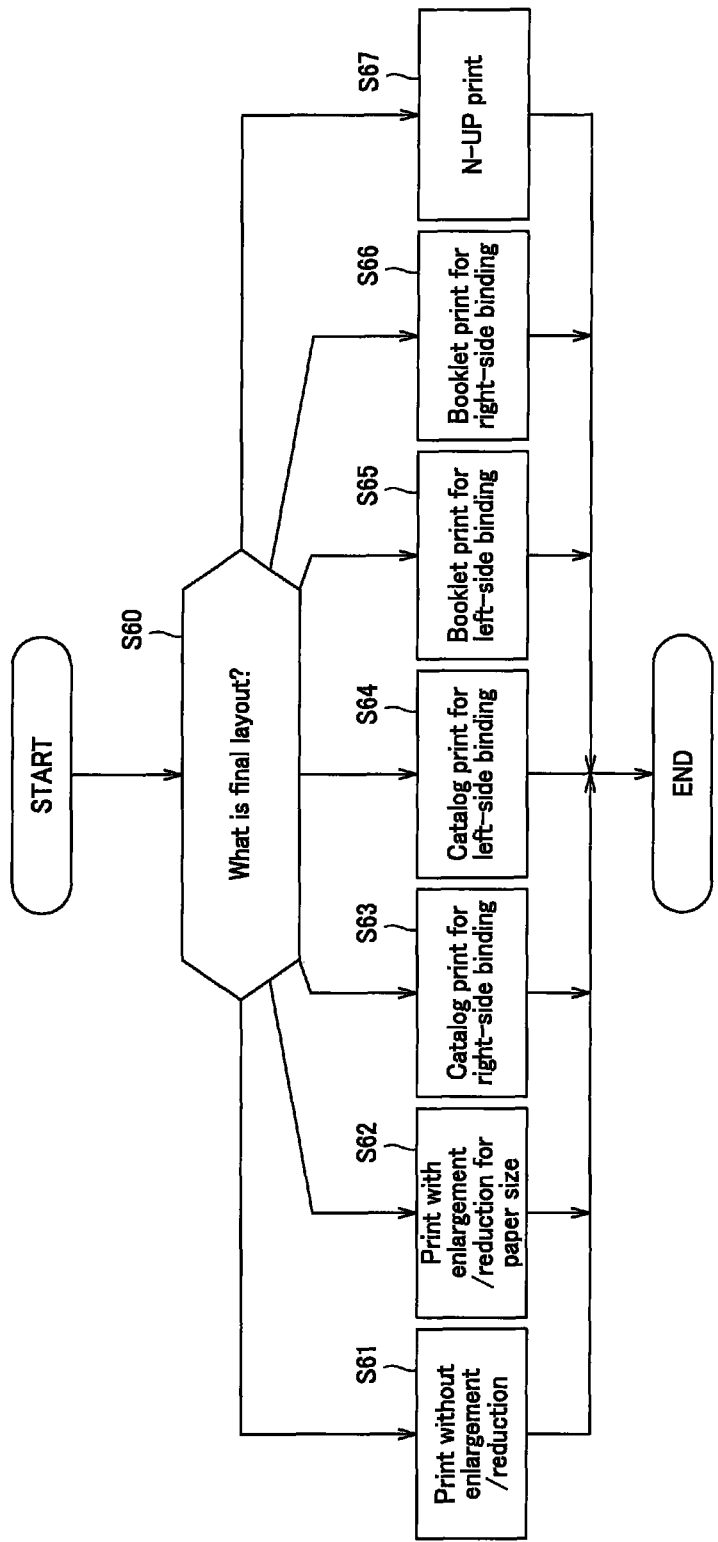
FIG. 11 shows a flow of operations made in the printing system when changing an additional pattern correspondingly to a final layout of a new PDF file generated by the direct-print utility.

In step S56 (see FIG. 9) in the printing system 100, the new PDF file generated by CPU 111 in the client 110, having the direct-print utility 10 installed therein, will have appended thereto a "tint block" and "watermark" in any of various manners depending upon information on a final layout as will be described below with reference to FIG. 11. That is, in step S60, it is first determined what the final layout is. The tint block or watermark to be appended is modified correspondingly to the final layout on the basis of the result of the determination.

Figure 12A:
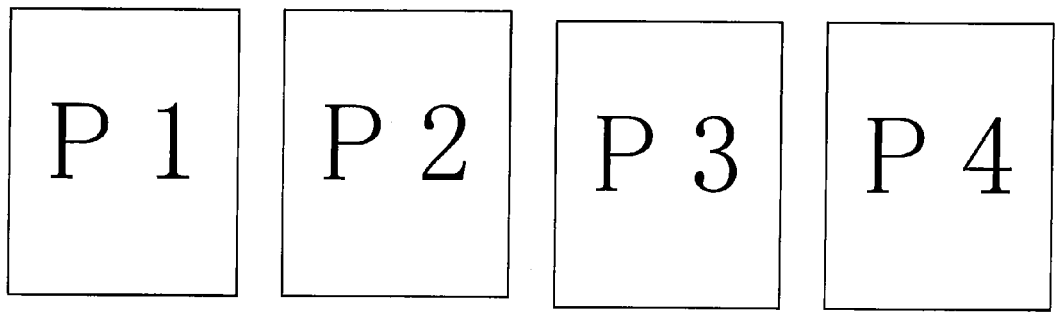
FIGS. 12A and 12B show an original as a printed image and a result of printing, respectively, with a final layout for print without enlargement/reduction.
Figure 12B:
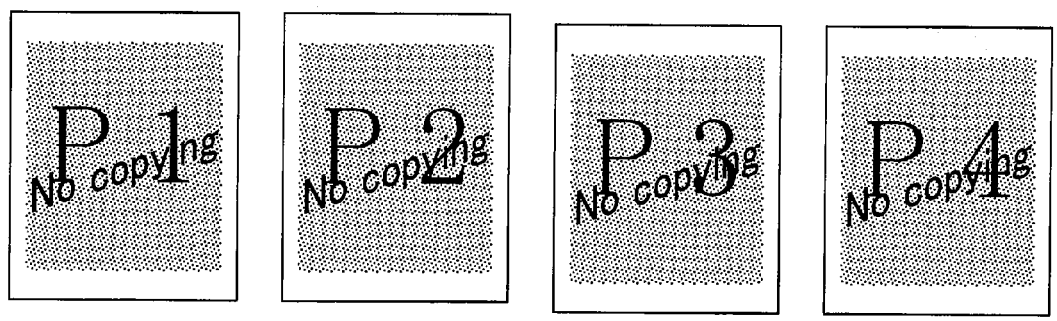

In case the final layout has been determined in step S60 to be "print without enlargement/reduction" (step S61), CPU 111 in the client 110 will control the DPF file re-making means 13 to append the same tint block and watermark to all pages. FIG. 12A shows printed images of originals and FIG. 12B shows printed images of the originals in the "print without enlargement/reduction" layout.

Figure 13:
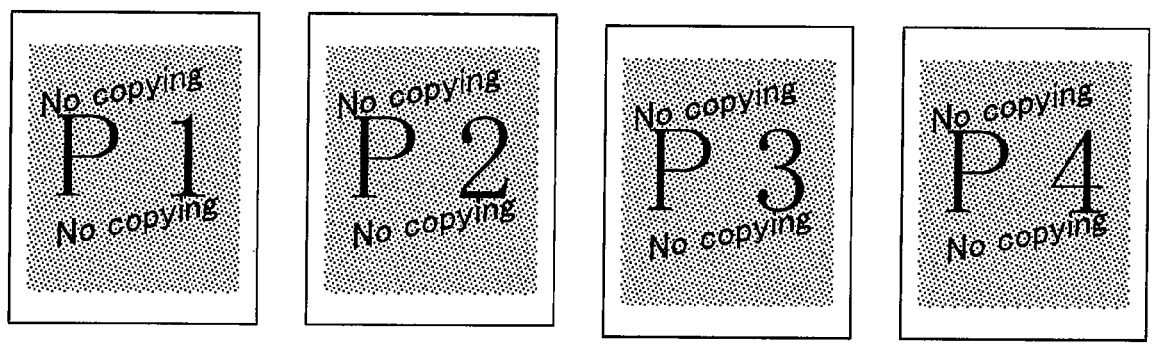
FIG. 13 shows a printed image based on a final layout for print with enlargement/reduction for paper size.

In case the final layout is "print with enlargement/reduction for paper size" (step S62), CPU 111 in the client 110 will inquire of the printer for the size of a paper currently used and control the PDF file re-making means 13 to append a tint mark and watermark corresponding to the current paper size. Actual printed images are shown in FIG. 13. A large printed image will be tiled. A small printed image will have only a part thereof finished.

Figure 14:
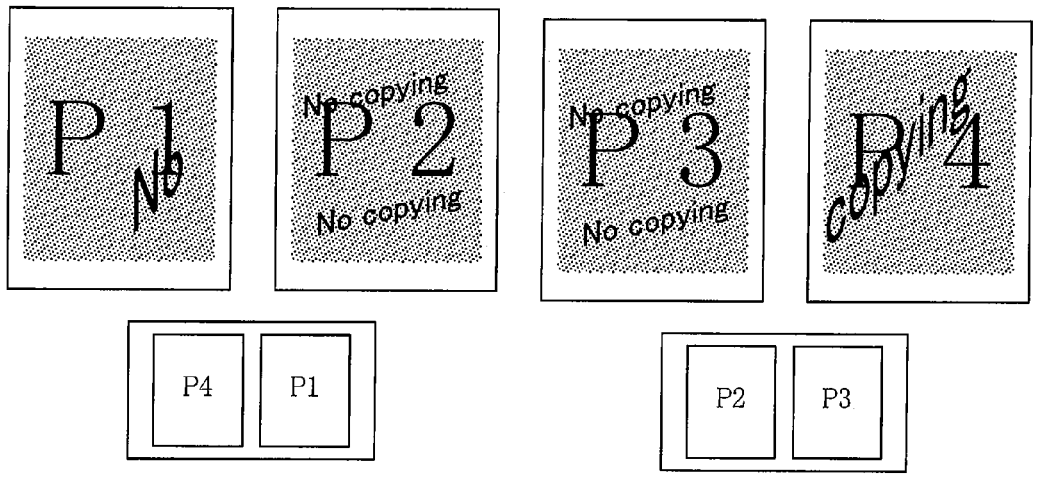
FIG. 14 shows a printed image based on a final layout for catalog print for right-side binding.

In case the final layout is "catalog print for right-side binding" (step S63), CPU 111 in the client 110 will control the PDF file re-making means 13 to append the tint block and watermark in full size to the first page and last even-numbered page and a right half of the tint block and watermark in a size double the area of them to an odd-numbered one of two pages in each of pairs of even- and odd-numbered pages including the second page to a page preceding the last one and a left half to an even-number one of the paired pages. Actual printed images are also shown in FIG. 14.

Figure 15:
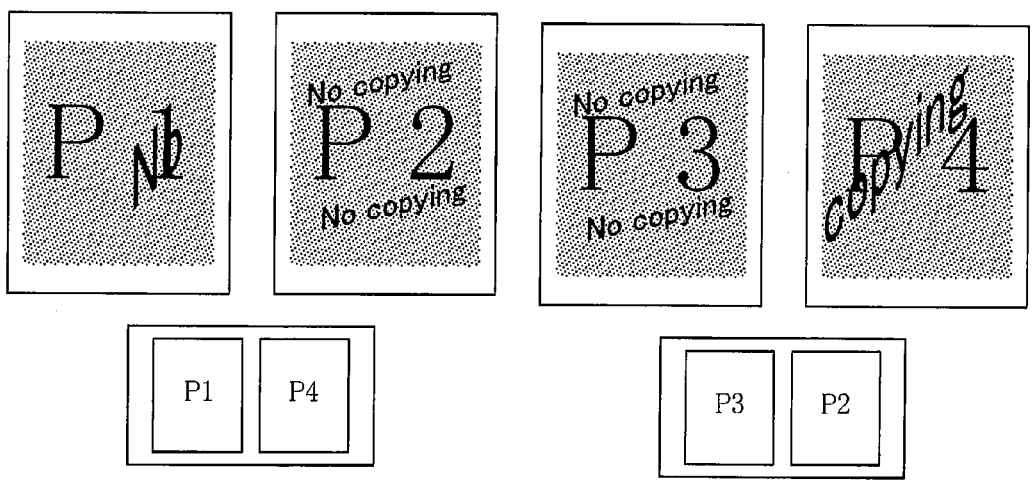
FIG. 15 shows a printed image based on a final layout for catalog print for left-side binding.

Also, in case the final layout is "catalog print for left-side binding" (step S64), CPU 111 in the client 110 will control the PDF file re-making means 13 to append the tint block and watermark in full size to the first page and last even-numbered page. Also, CPU 111 will control the PDF file re-making means 13 to append a right half of the tint block and watermark in a size double the area of them to an odd-numbered one of two pages in each of pairs of even- and odd-numbered pages including the second page to a page preceding the last one and a left half to an even-number one of the paired pages. Actual printed images are also shown in FIG. 15.

Figure 16:
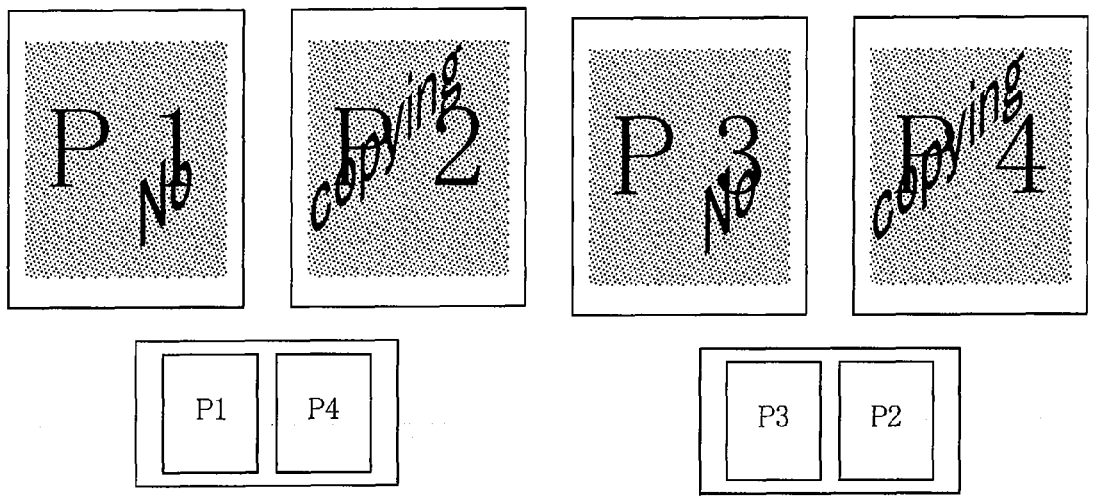
FIG. 16 shows a printed image based on a final layout for booklet print for left-side binding.

Also, in case the final layout is "booklet print for left-side binding" (step S65), CPU 111 in the client 110 will control the PDF file re-making means 13 to append the tint block and watermark to the last even-numbered page and first page in pair, second page and page preceding the last page in pair, . . .

so that printed pages will be bound together at the right side and left and right halves of the tint block and watermark equal in printed area to each other will face each other. Actual printed images are also shown in FIG. 16.

Figure 17:
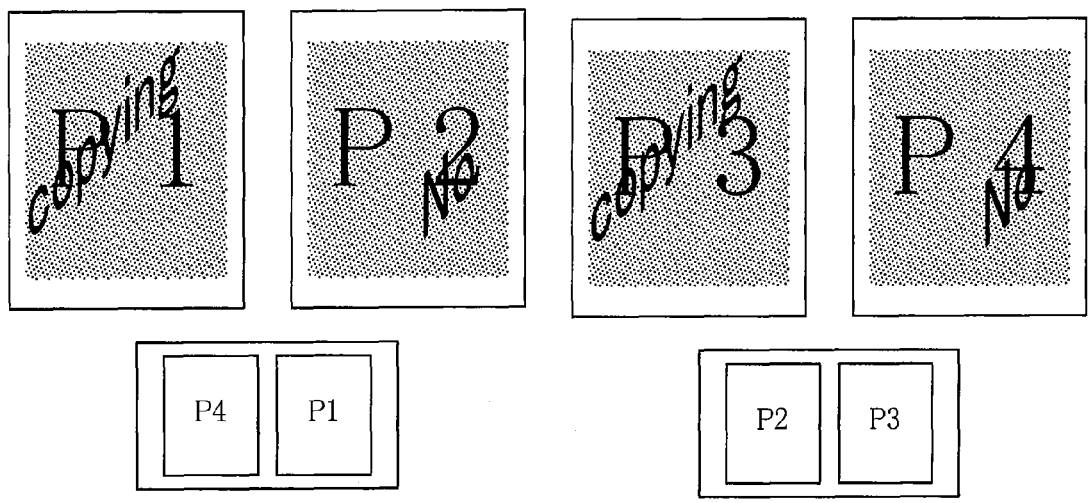
FIG. 17 shows a printed image based on a final layout for booklet print for right-side binding.

Also, in case the final layout is "booklet print for right-side binding" (step S66), CPU 111 in the client 110 will control the PDF file re-making means 13 to append the tint block and watermark to the first page and last even-numbered page in pair, page preceding the last page and second page in pair, . . . so that printed pages will be bound together at the left side and left and right halves of the tint block and watermark equal in printed area to each other will be opposite to each other. Actual printed images are also shown in FIG. 17.

Figure 18:
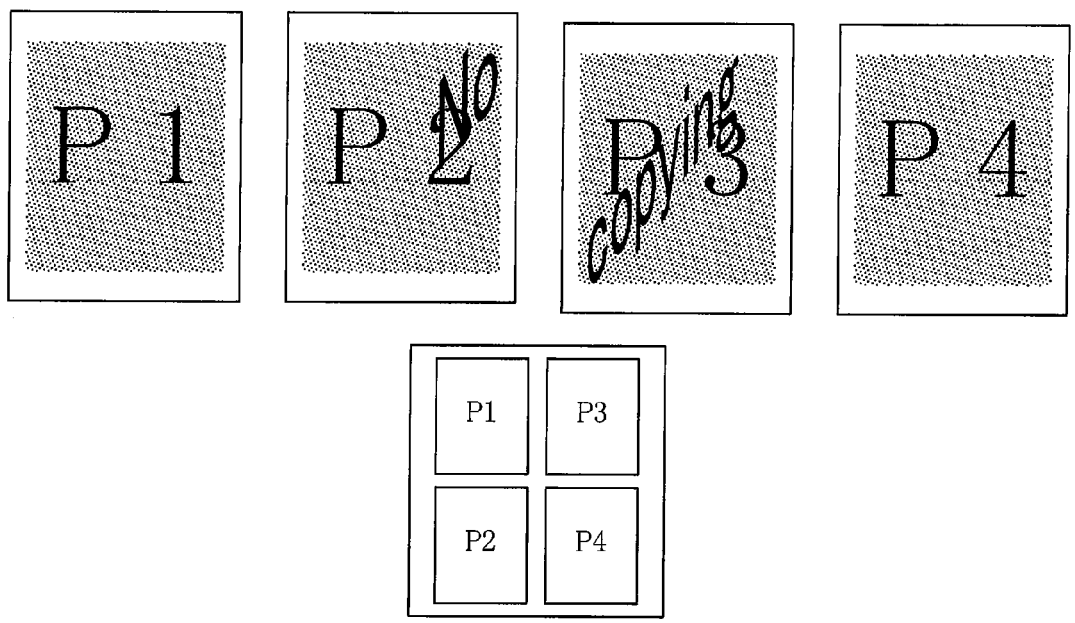
FIG. 18 shows a printed image based on a final layout for N-UP print.

Further, in case the final layout is "N-UP print" (step S67), CPU 111 in the client 110 will control the PDF file re-making means 13 to append a fraction of the tint block and watermark to each page so that the tint block and watermark will be seen normally on "N-Up" printed pages facing each other. Actual printed images are also shown in FIG. 18.

Figure 19B:
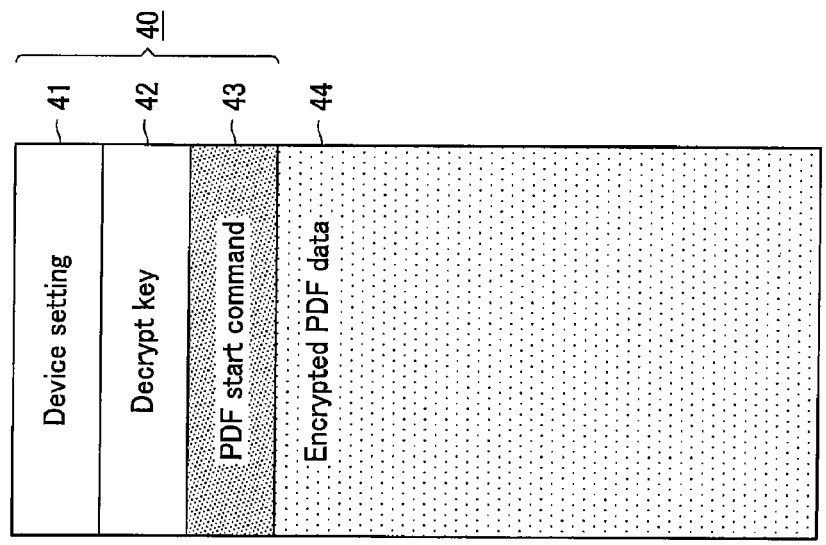
FIGS. 19A and 19B show a data structure for normal PDF transfer and data structure for encrypted PDF transfer, respectively.
Figure 19A:
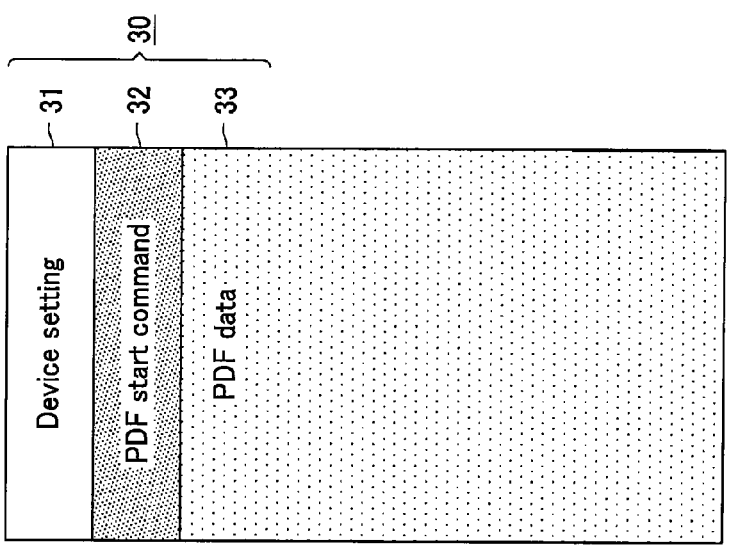

The data structure for transfer of normal DPF is shown in FIG. 19A, and data structure for transfer of encrypted DPF is shown in FIG. 19B. More particularly, for transferring the normal DPF, transfer data 30 is to include device setting data 31, PDF start command 32 and PDF data 33 as shown in FIG. 19A. For transferring the encrypted DPF, transfer data 40 is to include device setting data 41, decrypt key 42, PDF start command 43 and encrypted PDF data 44 as shown in FIG. 19B.

In this printing system 100, PDF data is encrypted with the function of the PDF file.

Figure 20:
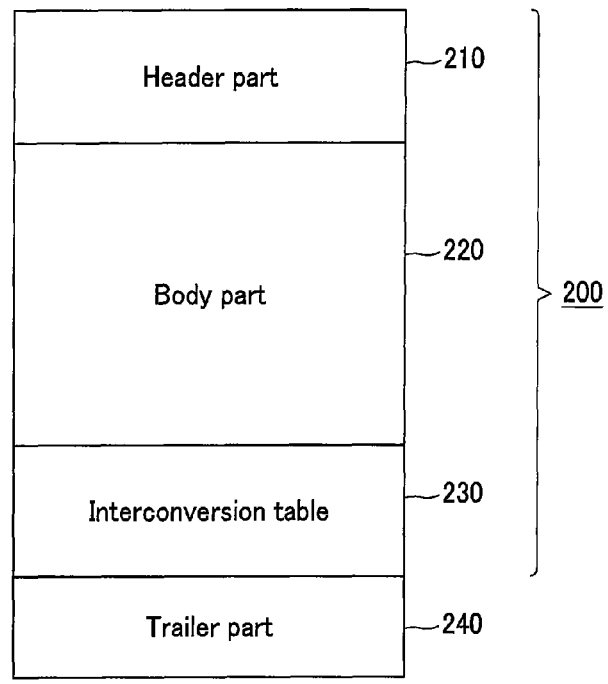
FIG. 20 is a conceptual diagram of a standard-PDF file structure.

The structure and interpretation of the PDF file will be explained herebelow:

FIG. 20 is a conceptual diagram of a standard-PDF file structure.

As shown in FIG. 20, a standard PDF file 200 consists of a header part 210, body part 220, interconversion table 230 and a trailer part 240.

In the header part 210, there is described a comment lead by "%". From the header part 210, it will be known that the file format is PDF, and the version of an applicable PDF specification will be known.

Figure 21:
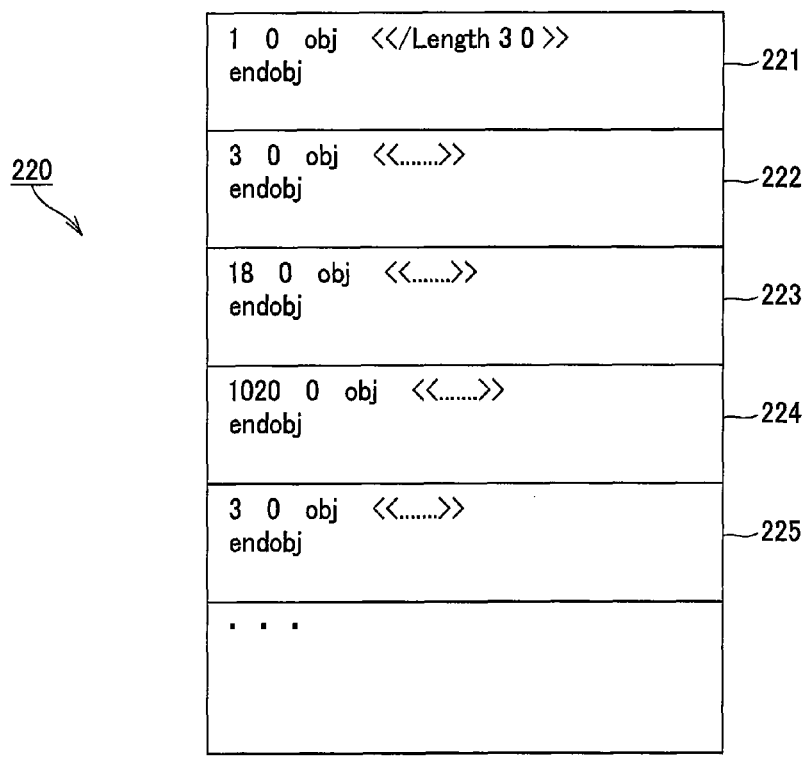
FIG. 21 is also a conceptual diagram of the body part of the PDF file.

The body part 220 includes a plurality of objects. An object refers herein to an individual element of a sentence. The concept of the body part 220 is shown in FIG. 21. Each object has an object number and its content which is actual depiction data. This content designates another object by number. A first object 221 is defined by description of "10obj" to "endobj", and other objects 222, 223, . . . are similarly defined. The objects include, for example, a page object, pages-list object, catalog object, data object, font object, etc.

As shown in FIG. 22, the interconversion table 230 is a list, formed like a table, of pointers to positions of objects each carrying depiction data grouped in a certain unit. In the interconversion table 230, the position of each object is represented by an offset. The "offset" refers herein to a number of bytes counted from the file top up to data of interest. Thus, random access is possible to objects included in the body unit 220. In the file, the interconversion table 230 begins with a line including a keyword "xref".

The trailer part 240 includes information to be accessed at start of analyzing a file. More specifically, the trailer part 240 has described therein information indicative of the interconversion table 230 in the file and the number for an object that is to be referenced to first as shown in FIG. 23. A numeral next to a flag "startxref" is an offset of the interconversion table 230. The trailer part 240 exists in the end portion of a file and begins with a line including a keyword "trailer".

For interpretation of a PDF file, the trailer part 240 existing at the end of data is necessarily referenced to examine where the interconversion table 230 exists in the data.

Figure 24:
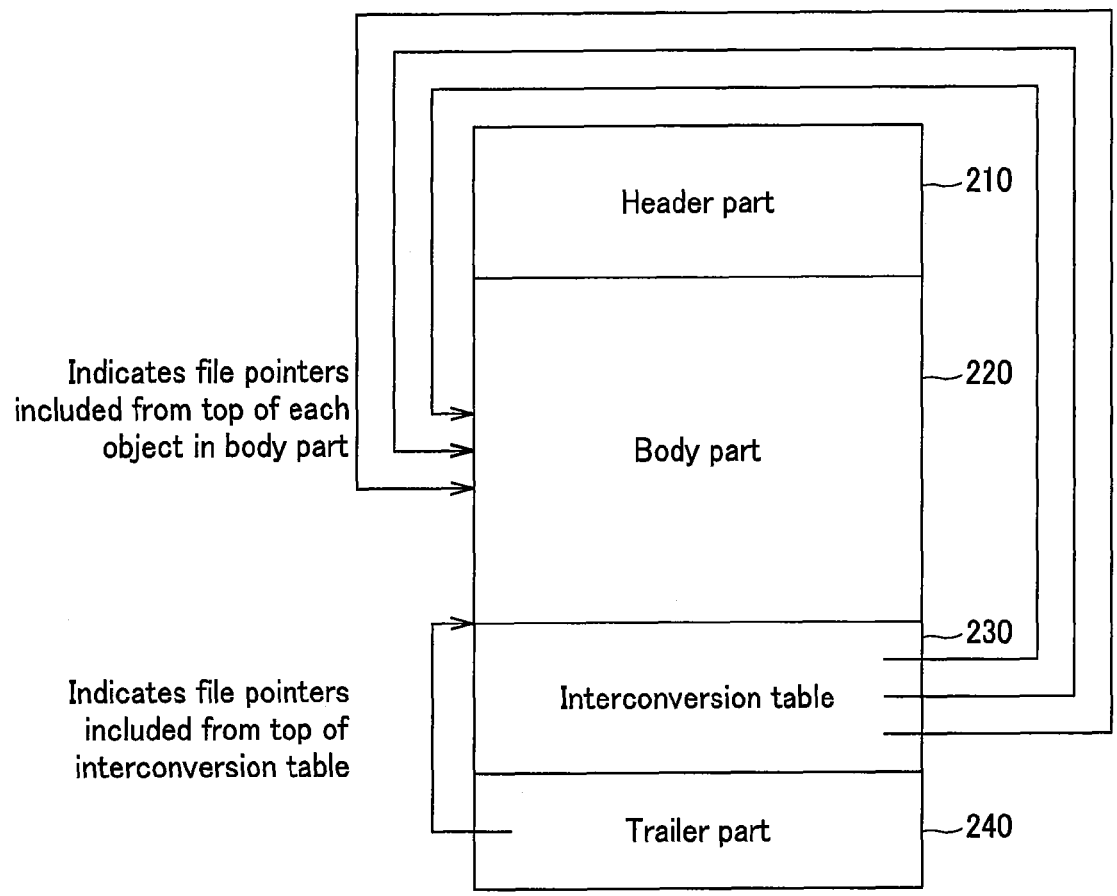
FIG. 24 shows a flow of operations made in searching object data to be depicted.

That is, for interpretation of the PDF file, the trailer part 240 is first searched for the interconversion table 230 as shown in FIG. 24, a necessary object pointer is found in the table 230 and the current status of the object is searched based on the pointer.

FIG. 24 shows a flow of operations made in searching depiction object data in the PDF file data structure shown in FIG. 20.

As shown in FIG. 23, the trailer part 240 includes the flag "startxref" indicating where the interconversion table 230 exists in the entire data. It is possible to search the data in the interconversion table 230 from the top through end of the latter for the value of the flag as a pointer. At this time, letters "Encrypt" exist in the encrypted PDF file. This letter string is not in a PDF file not encrypted. Two types of data including "letter string" and image are actually encrypted in a PDF file. A decrypt key is used in common to these types of data, but it is not existent in the PDF file itself. The printer 120 uses a decrypt key given from outside thereof. The "outside" of the printer 120 refers herein to a platform that controls the PDF file print routine.

The interconversion table 230 includes information on an object to be used for each page. When a target page is to be printed, the pointer for an object is known so that the entire data is searched from its beginning.

As shown in the conceptual diagram of the body part 220 in FIG. 21, each of objects in the body part 220 includes an object number and content thereof which is actual depiction data. In case another object is designed by number from the content, the interconversion table 230 is accessed again and operation of searching for a target object is repeated.

It is possible to search the interconversion table 230 for a necessary object pointer from the trailer part 240, and know the current status of the object on the basis of the pointer.

In this printing system 100 adopting an engine developed by the original maker, since information on the background darkness of the tint block and information on the darkness of characters on the background are stored which are compatible with the actual engine for correspondence between the engine and tint block, even the PDF direct-print utility 10 installed in the client 110 share the information. If it is not possible to obtain, from the printer driver, such information on the background darkness of the tint block and information on the darkness of characters on the background, the utility will use a fixed information table concerning printers used in the past, held therein. Thus, it is possible to print at least a tint block whose darkness corresponds to the engine performance.

Also, in the printing system 100, in case the PDF direct-print utility 10 has changed the content of the PDF file, it will encrypt the PDF file for transferring the file to the printer 120. The encrypt and decrypt keys are known only to the printer 120 and PDF direct-print utility 10. A PDF file additionally processed by the PDF direct-print utility 10 is encrypted without fail before transfer to the printer 120, and a decrypt key for the encrypted PDF file is transferred in a manner unique to the maker, whereby a printer 120 manufactured by the other maker will not be able to print the PDF file. Also, even if it is tried to capture data by monitoring along the transfer path, for example, if the data is stolen, the printer manufactured by the other maker will not be able to print the data. Even if a printer manufactured by the original maker can print the data to provide a printed matter, the content of additional processing with a watermark or the like by the utility will not be known to the printer since the PDF file has been encrypted. If a PDF file to be printed has already been encrypted, a decrypt key having been entered by the user into the PDF direct-print utility 10 will be required for re-making the PDF file. The decrypt key used for the PDF direct-print utility 10 to make re-encryption of the data should be quite different from that the user has entered. Thus, the other maker cannot be inhibited from analyzing the tool to analyze the content of a PDF file print based on the PDF direct-print utility 10. That is to say, the PDF encryption method in which an image having a tint block unique to the engine is re-made to provide a new PDF file is used against illegal misappropriation or conversion of the data. By encrypting an image necessarily when re-making a PDF file, it is possible to prevent PDF information from being leaked along the transfer path and the technique of the original maker from being analyzed by the other maker.

It should be noted that in this printing system 100, in case a PDF file has been re-made (re-processed) by the utility, the encryption process is used only for the purpose of preventing what has been done for the encryption from being known to the user and analyzer. That is, the encryption is not any indispensable for the present application.

Also it should be noted that the client and printer may be connected to each other via a network other than LAN, for example, WAN and Internet and Bluetooth, IrDA, USB connection or the like may be adopted for communication over other than any network. Also, the communication may be done by either radio or cable, or by either electrical or optical communication.

The printing program for implementing the printing system according to the present application may be stored in a ROM, hard disk or the like used in the client and printer, and also in a recording medium readable by a computer, for example, an external storage unit, portable recording medium or the like.

The above external storage unit may be an expansion memory or the like incorporating a storage medium such as a CD-ROM and laid outside, and connected to, the client and printer.

Also, the portable recording medium may be a recording medium connectable to the client and printer via a recording medium drive (drive unit) or communication post and also portable, for example, a flexible disk, memory card, magneto-optical disk or the like.

Further, the program recorded in the recording medium is loaded to a RAM or the like of a computer and executed by CPU in the computer. The program execution permits to the device management functions included in the embodiments having been described in the foregoing.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A printing system comprising:
 a client for sending file data, described in Portable Document Format (PDF); and
 a printer for directly printing the file data described in the PDF, sent from the client, wherein
 the client includes:
  additional pattern generating means for generating an additional pattern;
  print layout selecting means for selecting a print layout;
  client side decoding means for determining whether a PDF file under processing is encrypted, decoding the PDF file under processing encrypted with a first encryption key when the additional pattern is appended to the PDF file, and refraining from decoding the PDF file under processing encrypted with the first encryption key when the additional pattern is not appended to the PDF file;
  PDF file re-making means for analyzing the PDF file under processing decoded by the client side decoding means when the additional pattern is appended to the PDF file, and appending the additional pattern, generated by the additional pattern generating means, to the PDF file decoded by the client side decoding means consistent with the print layout selected by the print layout selecting means;
  encrypting means for encrypting, with a second encryption key different from the first encryption key, the PDF file with the additional pattern that has been re-made by the PDF file re-making means consistent with the print layout selected by the print layout selection means; and
  PDF file send-out means for appending to the encrypted PDF file including the additional pattern a decoding key for decoding the PDF file including the additional pattern encrypted by the encrypting means when the additional pattern has been appended to the PDF file, according to a preset rule established between the client and the printer that decodes the PDF file inclusive of the additional data encrypted by the encrypting means to print file data described by PDF, and for sending a result of the appendage to the printer, or for sending the encrypted PDF file to the printer without decoding the encrypted PDF file when the additional pattern is not appended to the PDF file, the printer includes:
  printer side decoding means for decoding, with the decoding key, the encrypted PDF file including the additional pattern sent from the client; and
  printing means for directly printing, in the print layout selected by the print layout selecting means, the file data described in PDF in the PDF file including the additional pattern decoded by the printer side decoding means, along with the additional pattern.

2. The printing system of claim 1, wherein the additional pattern is a water mark or a tint block.

3. The printing system of claim 1, wherein the additional pattern is a tint block, and the client prohibits an output size option to change an output size of the PDF file printed in the printing means of the printer.

4. The printing system of claim 1, wherein the additional pattern generating means verifies a machine type of the printer, acquires print density information regarding a print density of an additional pattern related with the machine type of the printer, and generates the additional pattern based on the print density information.

5. The printing system of claim 1, wherein a size of the additional pattern printed by the printing means is independent of the selected print layout.

6. A printing method in which file data described in Portable Document Format (PDF) is sent from a client to a printer and the file data described in PDF from the client is directly printed on the printer, the method comprising:
 in the client:
  generating an additional pattern;
  selecting a print layout;
  determining whether the PDF file under processing is encrypted;

decoding the PDF file under processing encrypted with a first encryption key when the additional pattern is appended to the PDF file or refraining from decoding the PDF file under processing encrypted with the first encryption key when the additional pattern is not appended to the PDF file;

analyzing the decoded PDF file under processing when the additional pattern is appended to the PDF file;

appending the additional pattern to the decoded PDF file consistent with the selected print layout, to perform processing to re-make the PDF file when the additional pattern is appended to the PDF file;

encrypting the re-made PDF file, including the additional pattern, with a second encryption key different from the first encryption key when the additional pattern is appended to the PDF file; and appending to the encrypted PDF file including the additional pattern a decoding key for decoding the encrypted PDF file including the additional pattern, according to a preset rule established between the client and the printer that decodes the encrypted PDF file inclusive of the additional data to print file data described by PDF when the additional pattern is appended to the PDF file, and sending a result of the appendage to the printer when the additional pattern is appended to the PDF file, or sending the encrypted PDF file to the printer without decoding the encrypted PDF file when the additional pattern is not appended to the PDF file, in the printer:

decoding, with the decoding key, the encrypted PDF file with the additional pattern, sent from the client; and directly printing, with the selected print layout, the file data described in PDF in the decoded PDF file including the additional pattern, along with the additional pattern.

7. The printing method of claim 6, wherein the additional pattern is a water mark or a tint block.

8. The printing method of claim 6, wherein the additional pattern is a tint block, and the client prohibits an output size option to change an output size of the PDF file printed by the printer.

9. The printing method of claim 6, wherein the client verifies a machine type of the printer, acquires print density information regarding a print density of an additional pattern related with the machine type of the printer, and generates the additional pattern based on the print density information.

10. The printing method of claim 6, wherein a size of the additional pattern printed by the printer is independent of the selected print layout.

11. A non-transitory computer readable storage medium storing a print processing program for executing printing in which file data described in Portable Document Format (PDF) is sent from a client to a printer, and in which the printer then directly prints the file data in PDF sent from the client, the print processing program comprising:

causing the client to:
generate an additional pattern;
select a print layout;
determine whether the PDF file under processing is encrypted;

decode the PDF file under processing encrypted with a first encryption key when the additional pattern is appended to the PDF file or refrain from decoding the PDF file under processing encrypted with the first encryption key when the additional pattern is not appended to the PDF file;

analyze the decoded PDF file under processing when the additional pattern is appended to the PDF file;

append the additional pattern to the decoded PDF file consistent with the selected print layout, to perform processing to re-make the PDF file;

encrypt the re-made PDF file, including the additional pattern, with a second encryption key different from the first encryption key when the additional pattern is appended to the PDF file; and append to the encrypted PDF file including the additional pattern a decoding key for decoding the encrypted PDF file including the additional pattern, according to a preset rule established between the client and the printer that decodes the encrypted PDF file inclusive of the additional data to print file data described by PDF, and send a result of the appendage to the printer when the additional pattern has been appended to the PDF file or send the encrypted PDF file to the printer without decoding the encrypted PDF file when the additional pattern is not appended to the PDF file, causing the printer to:

decode, with the decoding key, the encrypted PDF file with the additional pattern, sent from the client; and directly print, with the selected print layout, the file data described in PDF in the decoded PDF file including the additional pattern, along with the additional pattern.

12. The non-transitory computer readable storage medium storing the print processing program of claim 11, wherein the additional pattern is a water mark or a tint block.

13. The non-transitory computer readable storage medium storing the print processing program of claim 11, wherein the additional pattern is a tint block, and the print processing program causes the client to prohibit an output size option to change an output size of the PDF file printed by the printer.

14. The non-transitory computer readable storage medium storing the print processing program of claim 11, wherein the print processing program causes the client to verify a machine type of the printer, acquire print density information regarding a print density of an additional pattern related with the machine type of the printer, and generate the additional pattern based on the print density information.

15. The non-transitory computer readable storage medium storing the print processing program of claim 11, wherein a size of the additional pattern printed by the printer is independent of the selected print layout.

* * * * *